(12) United States Patent
Oberg et al.

(10) Patent No.: US 7,903,521 B2
(45) Date of Patent: Mar. 8, 2011

(54) WRITE SPLICE FOR OPTICAL RECORDING CHANNELS

(75) Inventors: Mats Oberg, Cupertino, CA (US); Pantas Sutardja, Los Gatos, CA (US)

(73) Assignee: Marvell World Trade Ltd., St. Michael (BB)

(*) Notice: Subject to any disclaimer, the term of this patent is extended or adjusted under 35 U.S.C. 154(b) by 0 days.

(21) Appl. No.: 12/849,634

(22) Filed: Aug. 3, 2010

(65) Prior Publication Data

US 2010/0315927 A1    Dec. 16, 2010

Related U.S. Application Data

(62) Division of application No. 11/546,744, filed on Oct. 11, 2006, now Pat. No. 7,782,726.

(60) Provisional application No. 60/779,950, filed on Mar. 7, 2006.

(51) Int. Cl.
*G11B 7/00* (2006.01)

(52) U.S. Cl. ............... 369/59.17; 369/59.25; 369/47.53; 369/47.31

(58) Field of Classification Search ............... 369/47.3, 369/47.31, 59.25
See application file for complete search history.

(56) References Cited

U.S. PATENT DOCUMENTS

| 5,677,802 | A  | * | 10/1997 | Saiki et al. ............... 360/51 |
| 6,381,706 | B1 | * | 4/2002  | Zaczek ..................... 714/5 |
| 7,245,568 | B2 | * | 7/2007  | Hikimura et al. ........ 369/47.3 |
| 2007/0070845 | A1 | * | 3/2007 | Sutardja ................ 369/47.53 |

* cited by examiner

Primary Examiner — Van N Chow

(57) ABSTRACT

An enhanced write splice for optical recording channels is disclosed. Optical control circuitry locks to previously-written data and determines the estimated write splice location. A training sequence is written to the optical medium at a location based on the estimated write splice location. The phase offset is then estimated by reading the training sequence. A new write splice location may then be calculated compensating for the phase offset estimate. Finally, the new data to be spliced may be written or overwritten to the channel at the new write splice location.

16 Claims, 11 Drawing Sheets

WRITE SPLICE FOR OPTICAL RECORDING CHANNELS

CROSS-REFERENCE TO RELATED APPLICATION

This application is a divisional patent application of Ser. No. 11/546,744, filed Oct. 11, 2006, which is a non-provisional patent application claiming the benefit of U.S. Provisional Patent Application No. 60/779,950, filed Mar. 7, 2006, which is hereby incorporated by reference herein in its entirety.

BACKGROUND OF THE INVENTION

This invention relates generally to optical recording channels and, more particularly, to improved systems and methods for splicing new data to existing data on optical recording media.

Data is stored on an optical disc in the form of microscopic pits (or marks) and lands (or spaces), which separate neighboring pits. As the optical disc spins, the pits and lands pass over an optical laser beam. The pits and lands of the disc reflect the laser beam at varying intensities. The reflected beam is then detected by an optical pick-up unit (OPU) and converted to a stream of binary data. Whenever the pick-up laser passes over a pit, a binary "0" is read. Whenever the pick-up laser passes over a land, a binary "1" is read. The resulting system of encoded channel data is then converted to user data by a series of decoding steps.

Most writable optical discs (e.g., CD, DVD, HD-DVD, and Blu-Ray discs) have grooves formed along spiral or concentric tracks. A specific variation may be applied to the wall of each groove in a groove formation process. A specific frequency may then be generated based on the specific variation in a recording/reproduction process. The specific frequency may be used as an auxiliary clock source, whereby the specific frequency is called a wobble signal.

Timing control and location information are maintained with the help of the wobble signals, and, in the case of DVD-R(W) media, land pre-pit signals. For example, when writing to an optical disc, the timing loop may be locked to a disc wobble signal. The wobble signal may also contain address information. Traditionally, during a write process, the timing lock on the wobble signal is maintained and the address information is monitored.

In some cases, however, new data may need to be abutted to a previously-recorded set of data on an optical disc. For example, using multi-session recording, each track of data is typically recorded in a single session, which is closed after the track is recorded. A lead-out may be written to the disc after the session is closed, and a lead-in may be written, which prepares the disc for a new session to be written in the future. As another example, a user may wish to incrementally add data to an existing track (e.g., using packet writing or any other suitable incremental writing technique), or some system interrupt (e.g., an empty write buffer or system distortion) may halt the writing process. At some later time, a user may wish to write more data to the disc so that it appears the old data and the new data were written in one sequence. The boundary between the set of previously-recorded data and the new data is called a write splice.

However, a write splice often appears as a phase jump to the optical read channel. This could result in a temporary loss of timing lock and data read errors. There are at least two reasons why a write splice may manifest itself as a phase jump. First, the timing loop phase with respect to the disc position may be different between the end of the first write and the beginning of the second write.

Second, the write path delay may vary between the first write session and the second write session, or the write path delay compensation may not be correctly calibrated. Since distortion in optical recording channels is highly volatile, there may be a great variation in timing loop jitter. For example, laser power may be pulsating during a write operation, but not during a read operation. This may result in drastically different values of jitter during the two operations. Therefore, locking to a wobble signal while tracking over a previously written portion of the disc is far from ideal when writing or splicing data.

Accordingly, it is desirable to provide systems and methods for improved splicing of data in optical channels. The improved write splice may reduce the phase jump in the read back signal at the write splice location. It is also desirable to provide systems and methods for improved write splices using both recordable (R) and rewritable (RW) optical media.

SUMMARY OF THE INVENTION

In accordance with principles of the present invention an improved write splice for optical recording channels is provided. Optical control circuitry locks to previously-written data and determines the estimated write splice location. A training sequence is written to the channel at a location based on the estimated write splice location. The phase offset is then estimated by reading the training sequence. A new write splice location may then be calculated compensating for the phase offset estimate. Finally, the new data to be spliced may be rewritten to the channel at the new write splice location.

In some embodiments, particularly when the recording channel is not rewritable (RW), the training sequence may be written to a write splice location in the calibration or test area of the disc. If there is no suitable data in this area, test data may be written to the disc before writing the test sequence. A phase offset may be estimated from reading the training sequence in the calibration or test area, and a new write splice location may be calculated compensating for the phase offset estimate. The new data to be spliced may then be written to the channel at the new write splice location.

In some embodiments, a training sequence is written to the disc and then overwritten with a replacement sequence that corresponds to the desired phase. The new data to be spliced may then be truncated and the first part of data to be written discarded. The truncated data may be written to the disc after the replacement sequence. Alternatively, the training pattern may be overwritten by the new data without truncating the new data. In these embodiments, error-correcting circuitry may correct any data read errors occurring during the overwritten sequence.

In some embodiments, the training sequence is chosen based on the first part of the new data to be spliced. For example, the training sequence may include the first part of the data to be spliced shortened by a fixed number of samples. The sequence may then be written to the channel at a location based on the estimated write splice location. The training sequence may be read, and the phase offsets at the transitions in the sequence may be measured. The average phase offset may then be computed. The actual data pattern to be spliced to the existing data may then be written over the training sequence compensating for the average phase offset.

In some embodiments, after estimating the phase offset, the training sequence is left intact on the disc, and the actual data to be spliced is abutted to the end of the training sequence. In these embodiments, delay compensation circuitry may correct for any delay introduced into the system.

In one embodiment of the invention, channel recording means may write a training pattern to an optical disc. Channel reading means may read the training pattern, and phase estimation means may calculate an estimated phase offset based on the training pattern read. Phase estimation means may then determine a new write splice location using the estimated phase offset, and channel recording means may write the new data at the new write splice location.

In one embodiment of the invention, a computer program running on a processor is provided to control an optical recording channel. The program may include program logic to cause an optical recording device to write a training pattern to an optical disc. The program logic may cause an optical read channel to read the training pattern and calculate an estimated phase offset based on the read signal. The program logic may then calculate a new write splice location based on the phase offset estimate and cause the optical recording device to write a new sequence of data at the new write splice location.

Further features of the invention, its nature and various advantages, will become more apparent from the accompanying drawings and the following detailed description.

DETAILED DESCRIPTION OF THE PREFERRED EMBODIMENTS

Embodiments of the present invention relate systems and methods for creating improved optical write splices. The improved write splices of the present invention may be created by any optical recording channel on any optical medium, including, but not limited to, CD, DVD, HD-DVD, and Blu-Ray media types. The media may be recordable (e.g., CD-R) or rewritable (e.g., CD-RW). Although some of the disclosed methods may be described in terms of only one of the aforementioned types of media, this is done for clarity of the description only and not by way of limitation.

Figure 1:
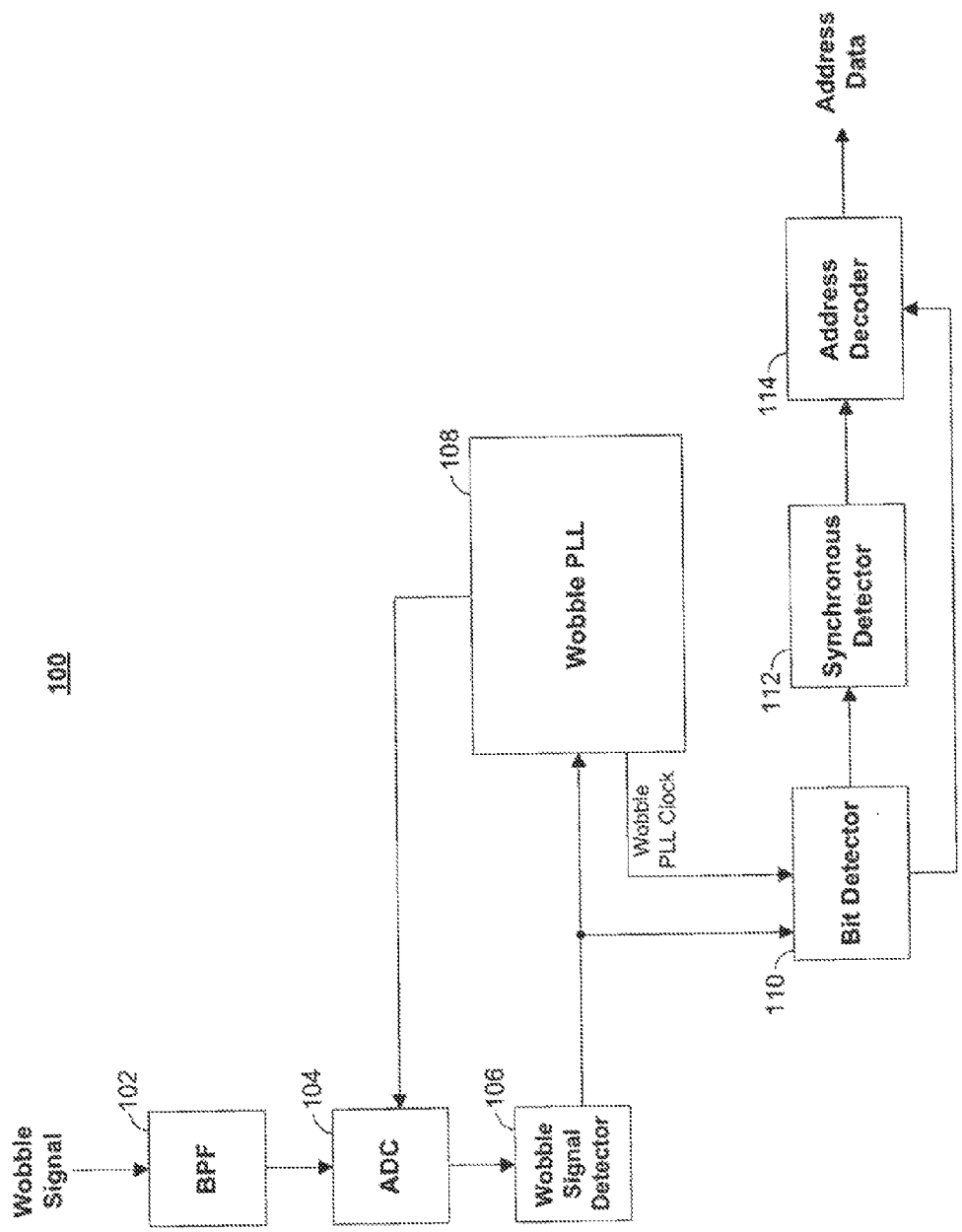
FIG. 1 is a simplified block diagram of an illustrative wobble signal detection apparatus in accordance with one embodiment of the invention.

FIG. 1 depicts simplified wobble signal detection apparatus 100 for detecting a wobble signal read from an optical disc. Wobble signal detection apparatus 100 includes bandpass filter (BPF) 102 for filtering a push-pull signal read from a writable optical disc. The wobble signal may be an analog or digital signal. BPF 102 may filter at a predetermined frequency band to remove a high frequency component noise component or a direct current (DC) offset component therefrom. Analog/digital (A/D) converter (ADC) 104 converts an output analog wobble signal of the predetermined frequency band from BPF 102 to a digital wobble signal output. Wobble signal detector 106, which may include a threshold detector or slicer, receives the digital wobble signal and detects the signal based on a predetermined reference or threshold level. For example, if a square wave wobble signal is used, the reference or threshold level may be a zero level.

The output of wobble signal detector 106 is connected to wobble phase locked loop (PLL) 108. Wobble PLL 108 is configured to output a wobble PLL clock synchronized with the wobble signal. Wobble signal detection apparatus 100 may also include bit detector 110. Bit detector 110 may detect or convert the wobble signal output from wobble signal detector 106 into a stream of bits (perhaps selected from the set (0, 1)) using the wobble PLL clock. Synchronous detector 112 may detect a synchronous pattern placed in the wobble signal from the bit stream and generate and output a synchronous signal corresponding to the detected synchronous pattern. Address decoder 114 may decode a physical address of the optical disc from the bit stream based on synchronous signal and output address information.

Typically, when a new set of data is about to be written to an optical channel, the timing loop is locked to a disc wobble signal. Address information pertaining to where to begin writing is obtained using wobble signal detection apparatus 100, and a recording laser writes the new data to the disc at the appropriate location on the disc. However, as described above, timing loop jitter is a major problem in optical channels. Since writing to the disc involves pulsating the laser power, the signal to noise ratio and/or signal characteristics may be different in the system when writing to a disc than when reading from a disc. Therefore, locking the timing loop to the wobble signal may result in a write that is off in phase by several bit periods or more.

In order to minimize this phase jump, the phase offset may be pre-calculated at or near the splice location. Then a new write splice location may be computed based on the calculated phase offset. Initially, the phase jump may be reduced within approximately 1 bit period by locking the timing loop to data (instead of the wobble signal) prior to the splice location. In general, there is a greater timing jitter when locking to the wobble signal as opposed to actual data. In addition, as described below, the data prior to the write splice location can also give address information. Therefore, by locking to data, both timing information and address information may be obtained, and there may be no need to read the wobble signal over the already written section.

For example, assuming the splice position relative to some address in the data is known (e.g., n bits after address mark k), once the optical pick-up unit (OPU) passes over the address mark, a counter may be started. Then, the appropriate write splice location may be calculated as n clock counts after address mark k. However, there is also a read path delay, $d_r$, which is the time from when the OPU passes over an address mark to when the address mark is actually detected. Similarly, there is a write path delay, $d_w$, which is the time from when a write pulse is generated to when the laser actually writes the pulse onto the optical disc.

Therefore, using the above example, if a pulse is to be written at the write splice, and the clock counter is started when address mark k is detected, the write pulse should be generated in accordance with:

$$\text{Count} = n - d_r - d_w \qquad (EQ\ 1)$$

Figure 2:
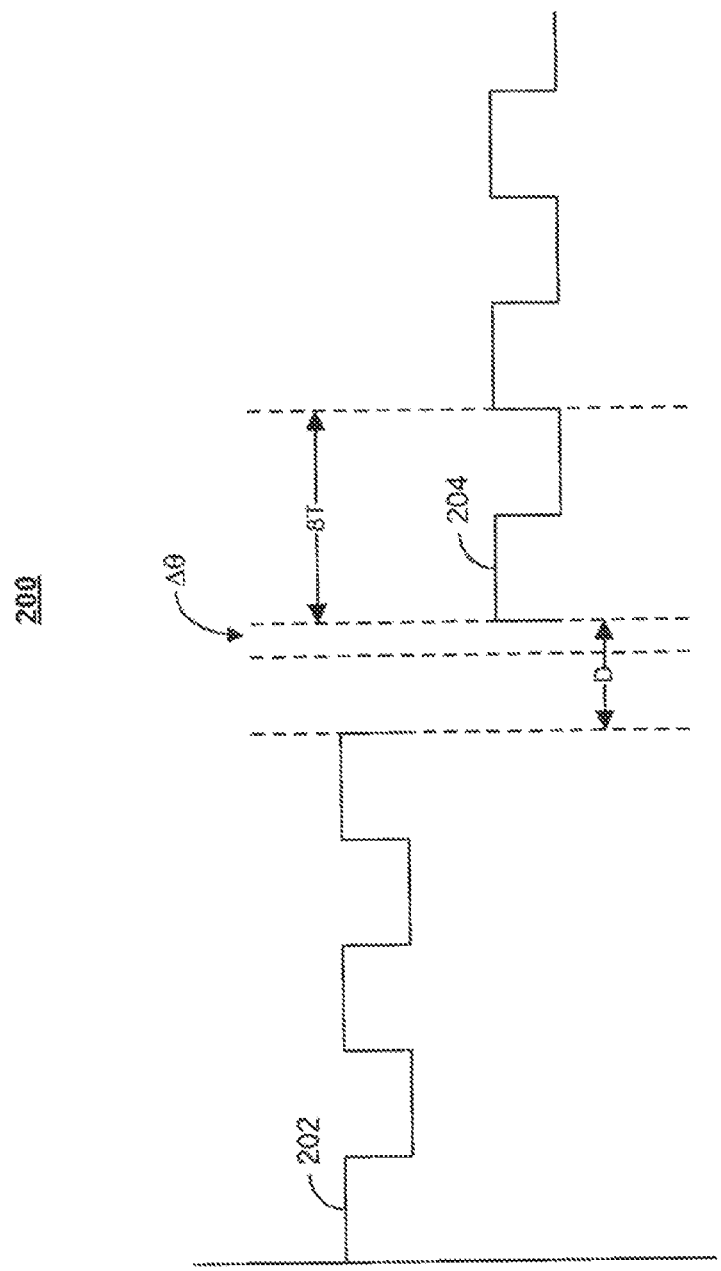
FIG. 2 is an illustrative channel diagram showing a test sequence written after an already recorded data sequence in accordance with one embodiment of the invention.

FIG. 2 shows illustrative channel diagram 200 in accordance with one embodiment of the invention.

Pattern 202 represents data previously written to the optical disc. If a user wishes to splice more data to the end of pattern 202, at some distance, D, from the end of pattern 202 a training sequence may be written. For example, in channel diagram 200 training sequence 204 is written to the disc. In some embodiments, training sequence 204 is written immediately after pattern 202 (i.e., D=0), although typically the value of D will be nonzero to avoid the possibility of overwriting a portion of pattern 202. The training sequence may take any form and may even be based on (or a modification of) the data to be written, as described in more detail below: A phase offset may be estimated by reading the known training sequence. This phase offset, labeled $\Delta\theta$ in the example of FIG. 2, may then be used to correct the write splice location so that the splice has a minimal phase jump. If the disc is rewritable, the actual data to be spliced may be rewritten to the disc at the corrected write splice location.

In the example of FIG. 2, training sequence 204 is a monotone sequence with a period of eight bit periods, or 8T (i.e., a repetition of 0-0-0-0-1-1-1-1). Although training sequence 204 may include any pattern, preferably a sequence is used so that the sequence's phase can be estimated quickly and with low complexity. Monotone sequences are therefore sometimes used throughout this description as training sequences; however, any training sequence may be used in other embodiments.

Figure 3:
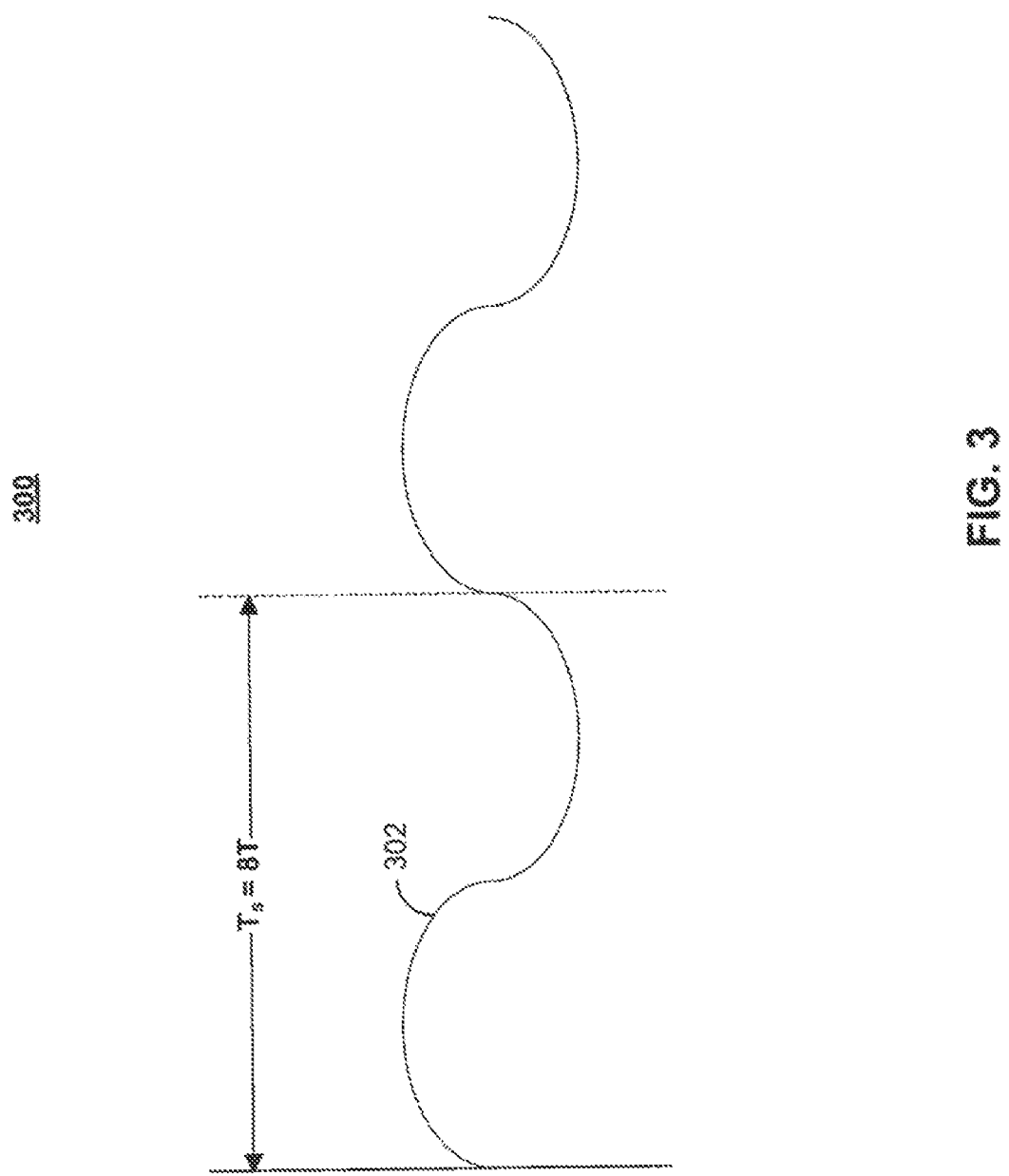
FIG. 3 is an illustrative sinusoidal read back waveform corresponding to the monotone test sequence of FIG. 2 in accordance with one embodiment of the invention.

FIG. 3 shows graph 300 of the 8T monotone training sequence of FIG. 2 passed through the optical recording channel. The square monotone data pattern may result in sinusoid 302 as the readback waveform because the higher order harmonics are typically blocked by the optical recording channel. In the example of FIG. 3, sinusoid 302 has a period of 8T. The phase of sinusoid 302 may be easily detected using a discrete Fourier transform (DFT), as described in more detail below in regard to FIG. 4. Likewise, the phase of any monotone training sequence may be estimated using a DFT, making a monotone pattern an ideal training sequence.

Figure 4:
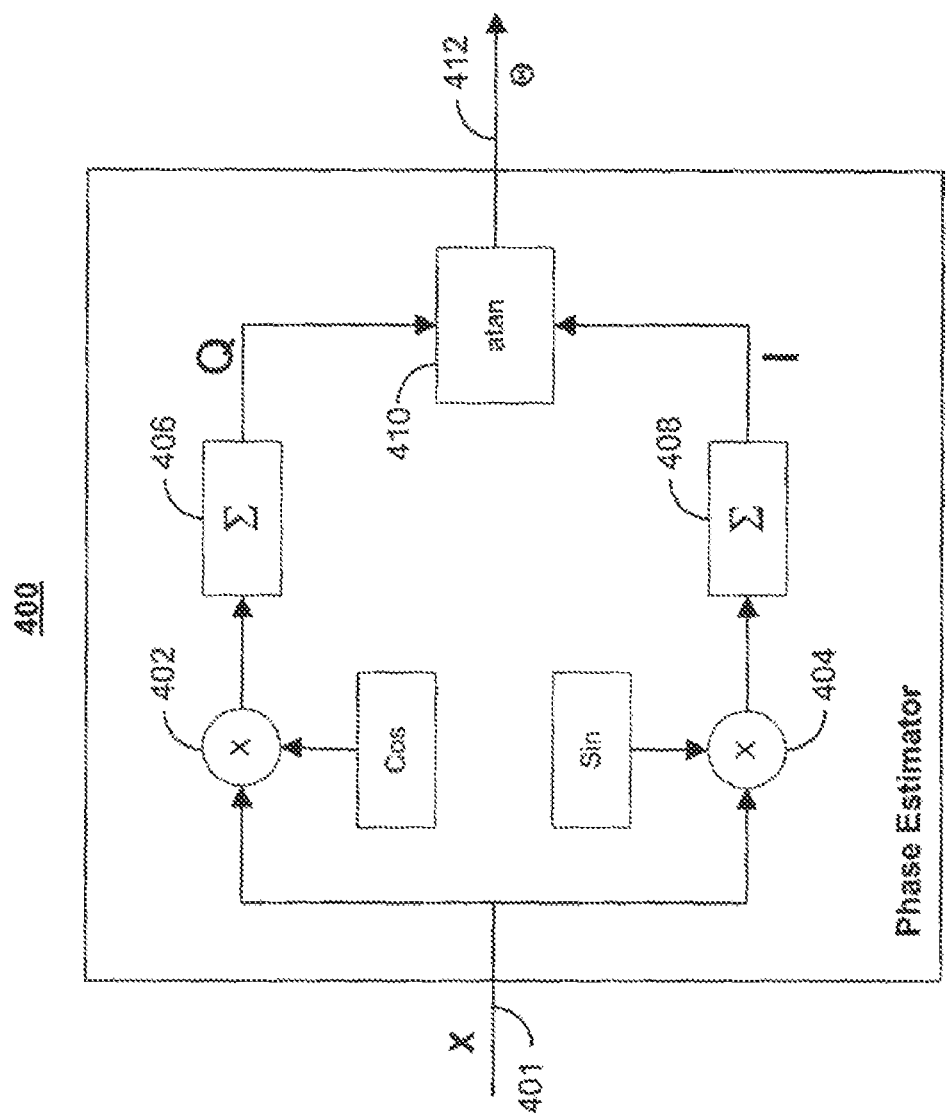
FIG. 4 is an illustrative phase estimator in accordance with one embodiment of the invention.

FIG. 4 shows illustrative phase estimator 400 (e.g., a quadrature demodulator) that uses the DFT method to compute the phase of a monotone training sequence. Readback waveform 401, which is designated by X in the example of FIG. 4, is correlated with a sine and cosine pattern at blocks 404 and 402, respectively. The in-phase component, I, may then be calculated by block 408 by integrating over one or more full periods (e.g., 8T, 16T, etc.) in accordance with:

$$I = \sum_{k=0}^{nT_2-1} x_k \sin 2\pi \frac{k}{T_t} \qquad (EQ\ 2)$$

where n is the number of periods to integrate over, $x_k$ is the read back sample at time k, and $T_t$ is the period of the monotone test sequence.

Similarly, the quadrature component, Q, may be calculated by block 406 by integrating over one or more full periods in accordance with:

$$Q = \sum_{k=0}^{nT_2-1} x_k \cos 2\pi \frac{k}{T_t} \qquad (EQ\ 3)$$

The phase may then be computed using the four quadrant arctangent in accordance with:

$$\Theta = \arctan(Q,I) \qquad (EQ\ 4)$$

where Q and I are the quadrature and in-phase components in accordance with EQ. 3 and EQ. 2, respectively.

In some embodiments, the training sequence is not a monotone signal. In these embodiments, the phase may be estimated using a decision-driven phase detector in the timing loop, if desired. For example, using the known training sequence as decisions and the readback waveform, phase estimates may be generated using any suitable method. As described in more detail in regard to FIG. 9, the phase estimates may then be averaged over some time period (e.g., 30 clock cycles), yielding a good estimate of the phase jump at the write splice location.

Figure 5:
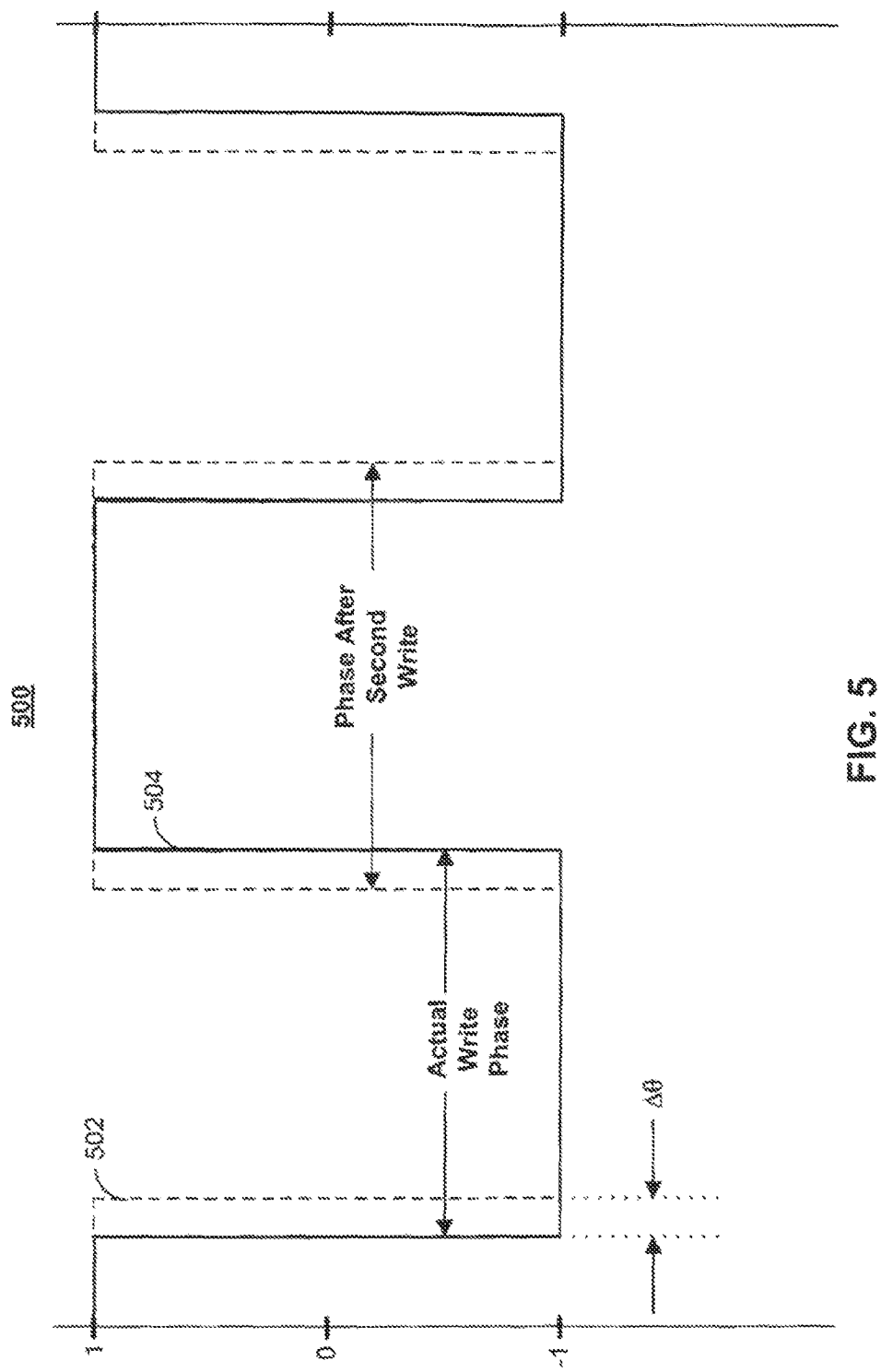
FIG. 5 is an illustrative graph showing an overwritten test sequence compensated for the calculated phase offset in accordance with one embodiment of the invention.

FIG. 5 is an illustrative graph showing an overwritten test sequence compensated for the calculated phase offset in accordance with one embodiment of the invention. In some embodiments (e.g., embodiments for use with non-rewritable media), monotone training sequence 504 may be written to the disc. The mark length of this training sequence may be at least one more than the shortest allowed mark length for the system (e.g., 3 for CD and DVD and 2 for HD-DVD and BD). After the phase offset has been determined from reading the training sequence, the first part of the data to be spliced may be discarded. The length of the data to be discarded may be equal to the length of the training sequence. Where the training sequence was previously written, replacement sequence 502 is written such that the old marks are completely overwritten. For example, if the training sequence included marks of length 4 and spaces of length 4, then replacement sequence 502 may have marks of length 5 and spaces of length 3. At the end of the replacement sequence, the remaining part of the actual data to be spliced may be written.

For non-rewritable media, only marks may be written. Thus, the only change to ah already written portion of the disc is to make the marks longer or make new marks where there are spaces. As shown in FIG. 5, replacement sequence 502 simply extends the marks made during the write process of monotone training sequence 504. The replacement sequence is written such that the phase of the new replacement sequence corresponds to the desired phase (i.e., the phase compensated for the estimated phase jump, labeled $\Delta\theta$ in FIG. 5). This estimated phase jump may be computed using any suitable technique, such as the DFT method described above.

FIGS. 6-10 show illustrative processes for improving a write splice in optical recording channels. Some of the methods may be described below as using either recordable (R) or rewritable (RW) media; however, this is for illustration only and not by way of limitation. The following processes may be used in any optical system and with any optical media (e.g., CD-R, DVD+RW, HD-DVD, and Blu-Ray type media).

Figure 6:
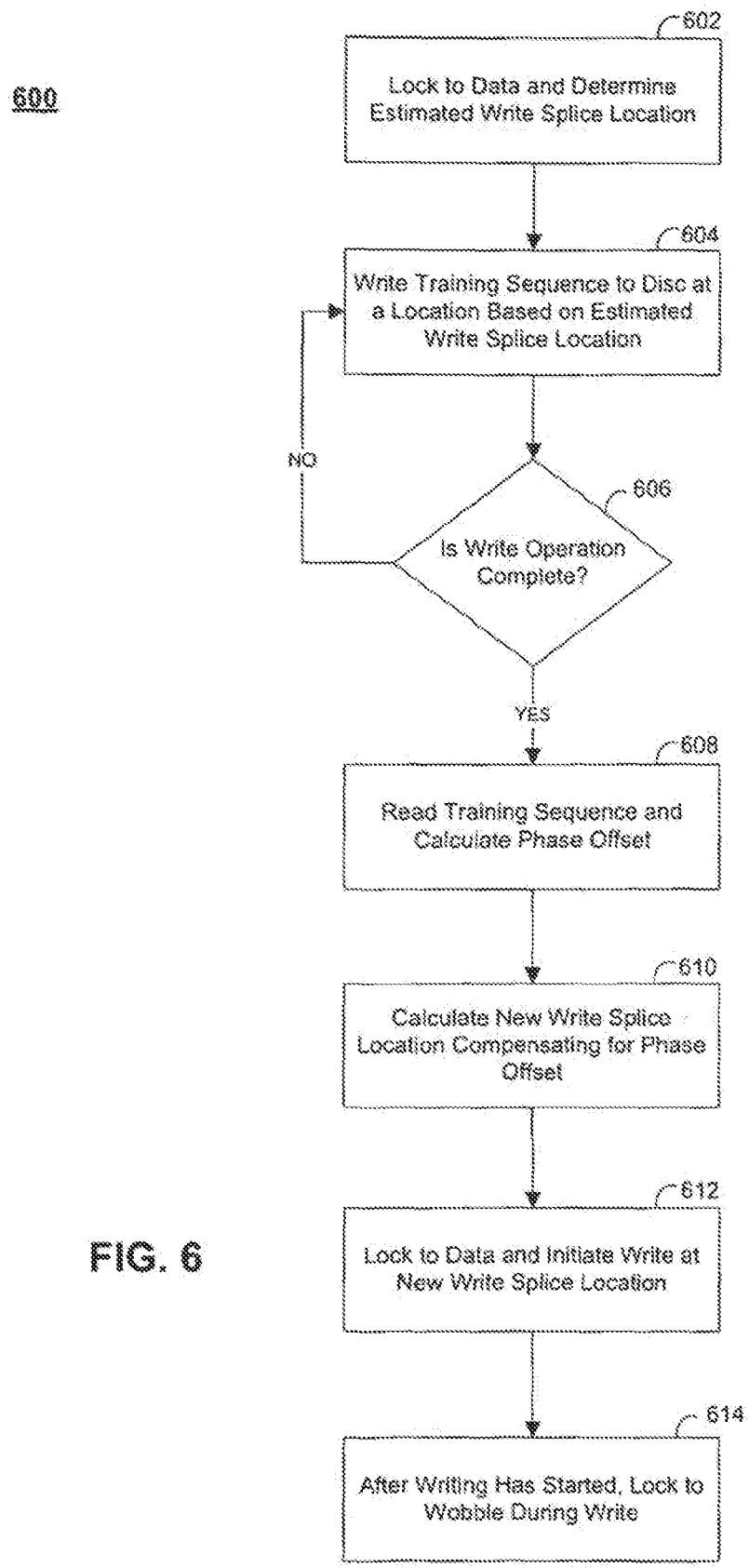
FIG. 6 is an illustrative method for creating an improved write splice using a rewritable media in accordance with one embodiment of the invention.

FIG. 6 shows illustrative process 600 for creating an improved write splice for use preferably with rewritable (RW) optical media. At step 602, the optical control may lock the timing loop to data and determine the approximate write splice location. As described above, locking to data (as opposed to a disc wobble signal) generally reduces the phase jump to within about one bit period. At step 604, timing loop updates may be stopped and a training sequence may be written to the disc. This training sequence may be written at the approximate write splice location determined at step 602 or some distance, D, after the estimated write splice location. The training sequence may be written at the approximate write splice location while the timing loop is locked to data or a disc wobble signal.

At decision 606, the optical control may determine if the training sequence write operation is complete. For example, the training sequence may be 32 bit periods long. Once the write operation is complete, the optical control may once again lock the timing loop to data and determine the approximate write splice location. At step 608, the optical control may read the training sequence and calculate an estimated phase offset. The phase offset may be estimated while the timing loop is locked to data or a disc wobble signal. For example, the estimated phase offset may be the phase offset of the training sequence read. The phase of the training sequence may be determined using any suitable phase estimator (e.g., quadrature demodulator 400 of FIG. 4). Using this phase offset estimate, at step 610 the write strategy for the splice may be adjusted to compensate for the estimated phase offset. For example, a new write splice location may be determined that compensates for the estimated phase offset so that the phase jump is minimized. At step 612, timing updates may be stopped, and the timing loop may be locked to data. Alternatively, in some embodiments, the timing loop may be locked to a disc wobble signal instead of data at step 612. The new data write may then be initiated at the new write splice location. At step 614, during the rewrite, the optical control may begin to lock the timing loop to a disc wobble signal.

In practice, one or more steps shown in illustrative process 600 may be combined with other steps, performed in any suitable order, performed in parallel (e.g., simultaneously or substantially simultaneously) or removed.

Figure 7:
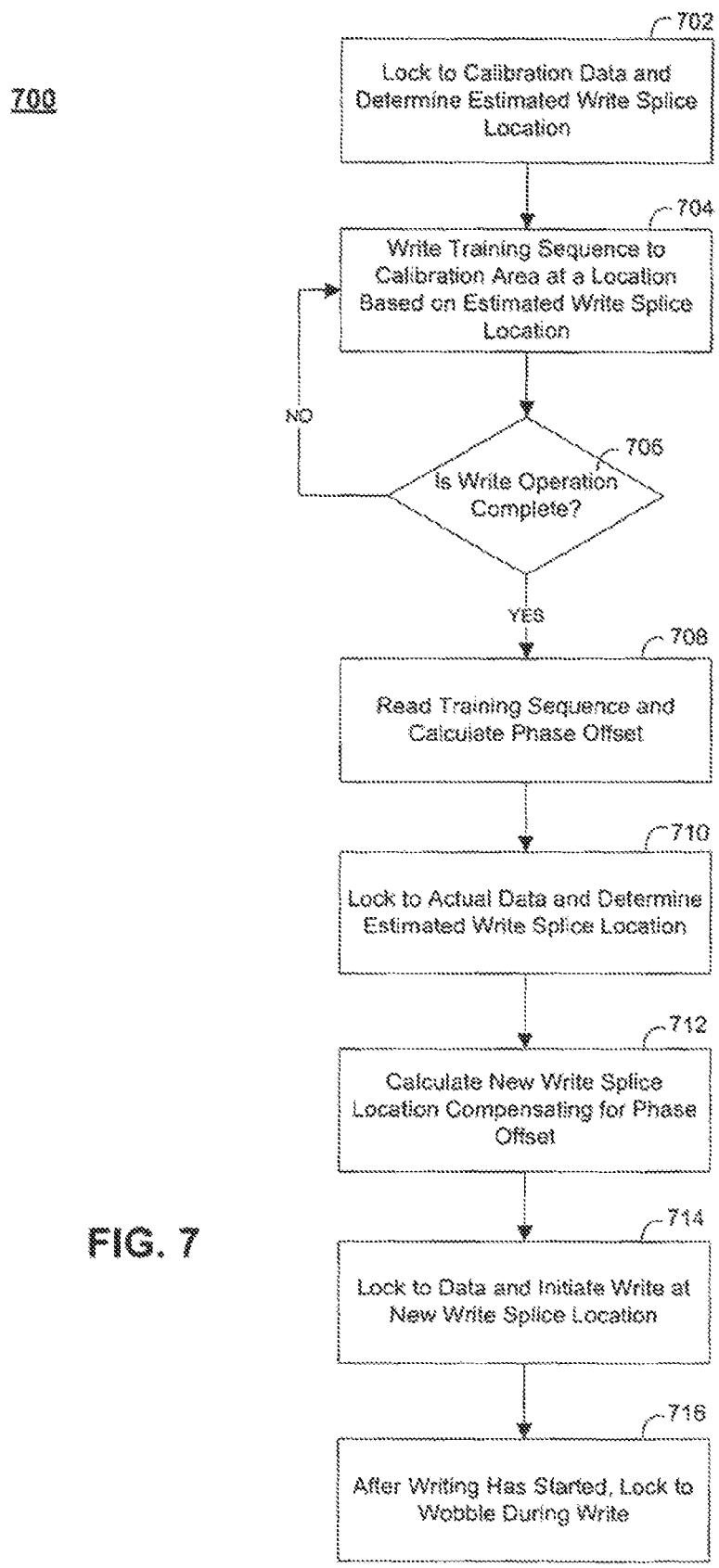
FIG. 7 is an illustrative method for creating an improved write splice using a non-rewritable media in accordance with one embodiment of the invention.

For non-rewritable, or recordable (R) type media, several alternate approaches may be taken. FIG. 7 shows illustrative process 700 for writing the training sequence to a write splice location in the calibration or test area of the disc. The calibration or test area may include any area on the disc typically ignored by the optical drive. For example, the write splice pre-gap area following the lead-in preceding the first track on the disc may be used as the calibration or test area in some embodiments.

At step 702, the optical control may lock to data in the calibration or test area of the disc and determine its approximate write splice location. If there is no suitable data in the calibration or test area of the disc, then a sequence may be written with a known address mark (e.g., a monotone pattern with an address mark toward the end of the sequence). At step 704, a training sequence may be written to the calibration or test area of the disc. This training sequence is written at the estimated write splice location determined at step 702 or some distance, D, after the estimated write splice location. The training sequence may be written at the estimated write splice location while the timing loop is locked to data or a disc wobble signal.

In some embodiments, the training sequence write operation is performed using simulated conditions to help better match the conditions at the actual write splice (and thus yield a more accurate phase offset value). For example, the writing of the training sequence in the calibration or test area of the disc may be performed with the spindle speed adjusted so that the data rate is the same as the data rate at the actual write splice location. In other embodiments, the optical control may keep the spindle speed and data rate constant yielding shorter or longer marks depending on if the calibration area is closer or farther away from the hub than the write location. In still other embodiments, the data rate is adjusted so that the shortest mark length is constant.

At decision 706, the optical control may determine if the training sequence write operation is complete. For example, the training sequence may be 32 bit periods long. Once the write operation is complete, the optical control may once again lock the timing loop to data and determine the approximate write splice location. At step 708, timing loop updates may be stopped and the training sequence may be read. From the training sequence read, the phase offset may be estimated. The phase offset may be estimated while the timing loop is locked to data or a disc wobble signal. For example, the estimated phase offset may be the phase offset of the training sequence read. The phase of the training sequence may be determined using any suitable phase estimator (e.g., quadrature demodulator 400 of FIG. 4). At step 710, the optical control returns to the actual write splice track, locks the timing loop to data or a disc wobble signal, and determines the approximate write splice location. Using the phase offset estimate calculated at step 708, at step 712 the write strategy for the splice may be adjusted to compensate for the estimated phase offset. For example, a new write splice location may be determined compensating for the estimated phase offset so that the phase jump is minimized. At step 714, timing updates may be stopped, and the timing loop may be locked to data. The new data write may then be initiated at the new write splice location. At step 716, during the write, the optical control may begin to lock the timing loop to a disc wobble signal.

In practice, one or more steps shown in illustrative process 700 may be combined with other steps, performed in any suitable order, performed in parallel (e.g., simultaneously or substantially simultaneously) or removed.

Figure 8:
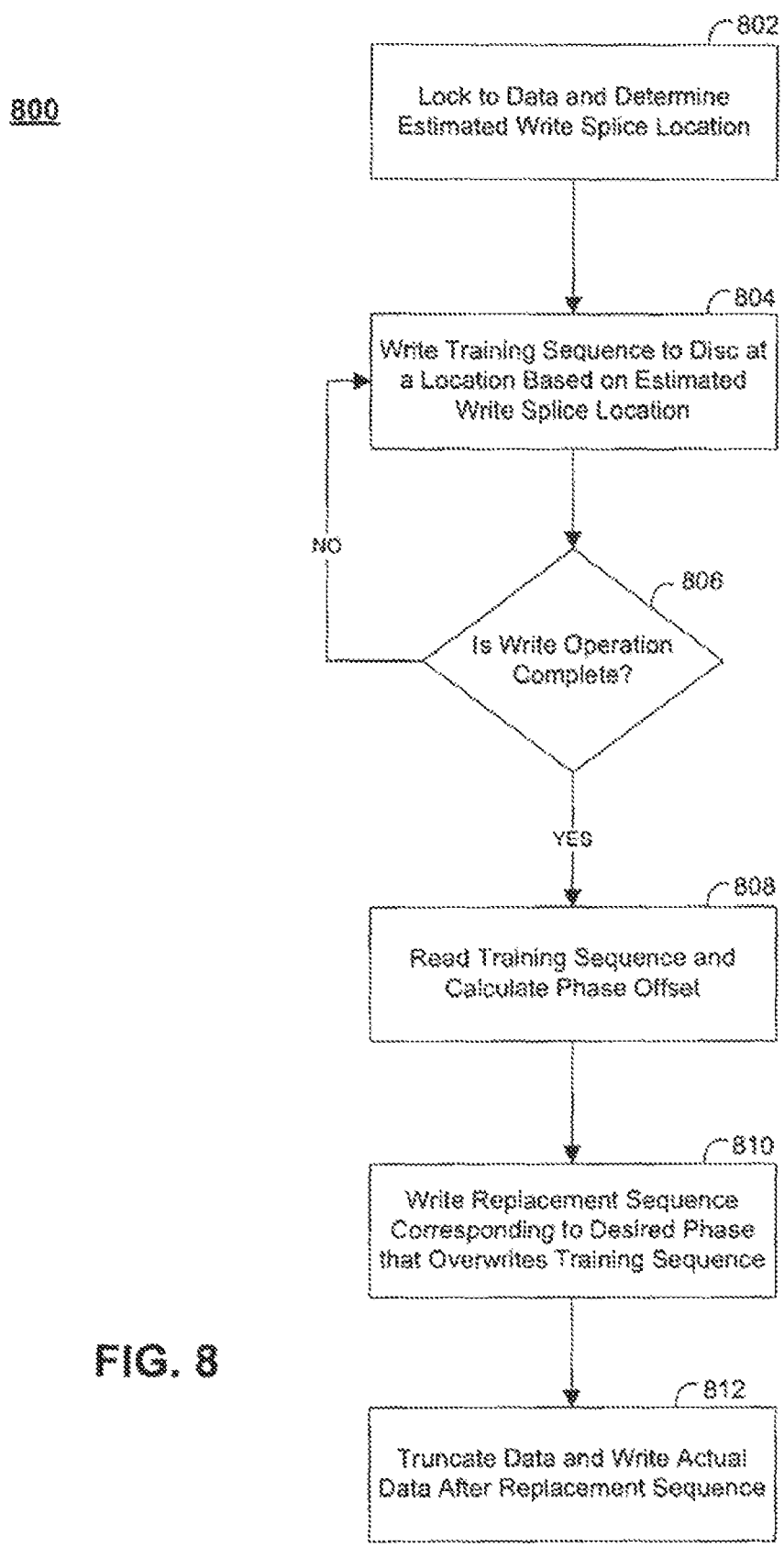
FIG. 8 is another illustrative method for creating an improved write splice using a non-rewritable media in accordance with one embodiment of the invention.

FIG. 8 shows another illustrative process for improving a write splice on non-rewritable optical media. Illustrative process 800 does not utilize the calibration or test area of the disc as in illustrative process 700. Similar to illustrative process 600 for rewritable media, at step 802 the optical control may lock the timing loop to data and determine the estimated write splice location on the disc. At step 804, a training sequence may be written to the disc at a location based on the estimated write splice location. For example, the training sequence may be written at some distance, D, after the estimated write splice location.

The training sequence preferably is monotone with a mark length of at least one more than the shortest allowed mark length for the system (e.g., 3 for CD and DVD and 2 for HD-DVD and Blu-Ray media). For example, a mark length of 4 bit periods should work for all systems. At decision 806, the optical control may determine if the training sequence write operation is complete. For example, the training sequence may be 32 bit periods long. Once the write operation is complete, the optical control may once again lock the timing loop to data and determine the approximate write splice location. At step 808, timing loop updates may be stopped and the training sequence may be read. From the training sequence read, the phase offset may be estimated. For example, the estimated phase offset may be the phase offset of the training sequence read. The phase of the training sequence may be determined using any suitable phase estimator (e.g., quadrature demodulator 400 of FIG. 4).

At step 810, a new replacement pattern may be written over the training sequence. The replacement pattern may completely overwrite the training sequence by extending marks of the training sequence or creating new marks where there are spaces. As shown in FIG. 5, this replacement sequence is written so that the replacement sequence compensates for the phase offset calculated at step 808. The actual data pattern may be truncated at step 812 and written to the optical media after the replacement sequence. The length of data to be truncated may equal the length of the replacement sequence. In these embodiments, the replacement sequence will most likely result in a data error unless the sequence matches the truncated data. This amount of data loss is negligible in most systems and may be corrected by an ECC decoder or some other error-correcting circuitry.

Figure 9:
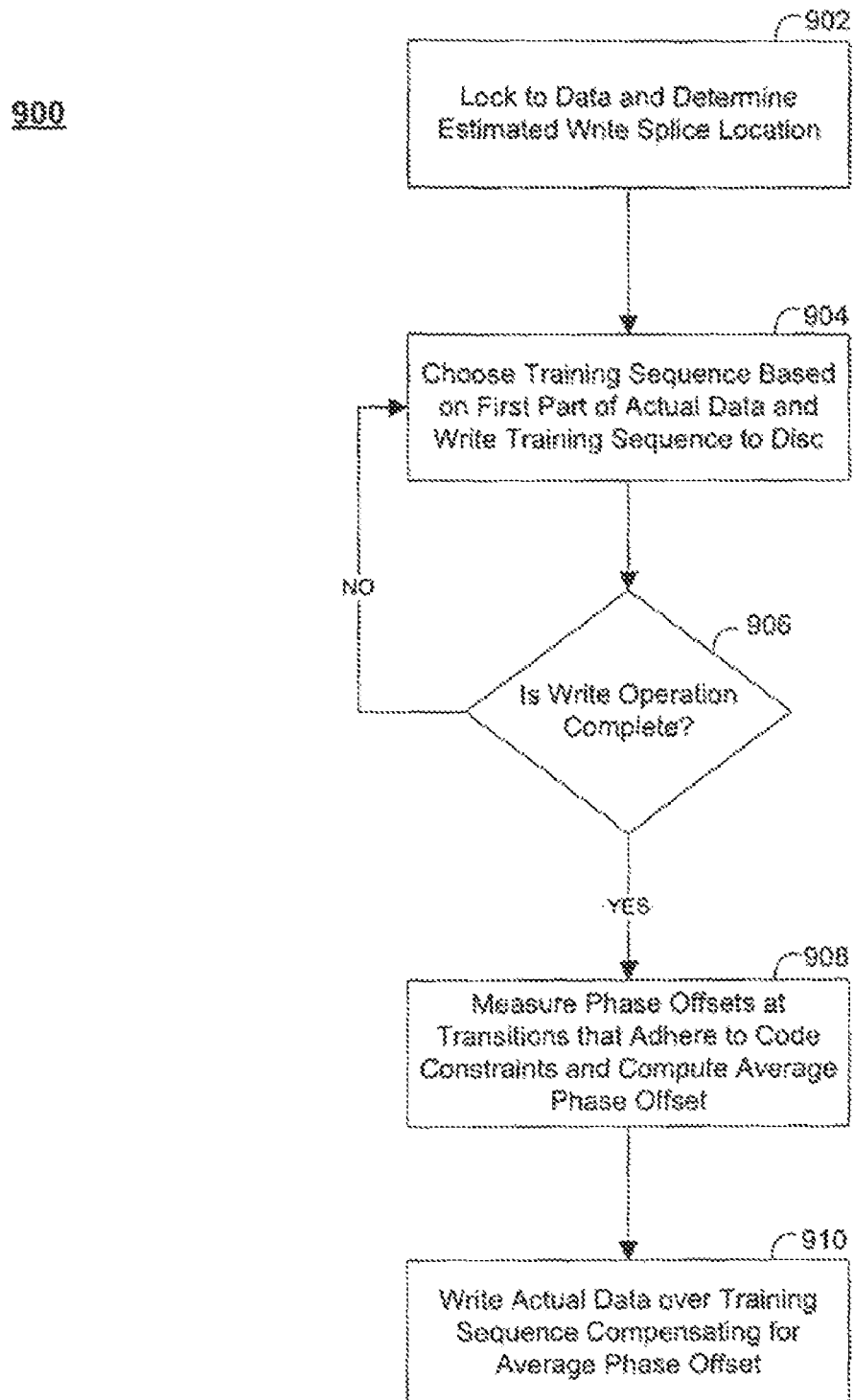
FIG. 9 is another illustrative method for creating an improved write splice using a non-rewritable media in accordance with one embodiment of the invention.

In some embodiments for non-rewritable media, the training sequence may be based on the first part of the data that is to be spliced to the existing data. For example, FIG. 9 shows illustrative process 900 where the training sequence may be chosen based on the first part of the data to be written with the marks shortened by some number of bit periods (e.g., one bit period at each end of the marks). At step 902, the optical control may lock the timing loop to data and determine the estimated write splice location on the disc. At step 904, the training sequence (which is based on the first part of the actual data to be spliced to the existing data) may be written to the disc at a location based on the estimated write splice location. For example, the training sequence may be written at some distance, D, after the estimated write splice location. At decision 906, the optical control may determine if the training sequence write operation is complete. For example, the training sequence may be 32 bit periods long. Once the write operation is complete, at step 908, the phase offset may be estimated by measuring the phase offsets at the training sequence transitions that adhere to the code constraints. The actual phase offset estimate may then be computed, for example, by averaging all the phase offsets measurements at transitions. Preferably, the phase estimate is calculated using the readback waveform and the known data pattern, but the detected data pattern may be used in some embodiments as well. Since the training sequence was based on the first part of the actual data to be written (but, for example, with the marks shortened by one bit period on each end), as long as the phase offset is with +/−1T (one bit period), the desired data pattern adjusted for the phase offset estimate can be written over the training sequence at step 910. The length of the marks of the training sequence may be shortened by any desirable amount, depending on the expected phase offset of the write splice.

As another example, if it is known that the phase offset is going to be less than +/−½T (one-half bit period), then the training sequence may be chosen based on the first part of the actual data to be written with the marks shortened by 1 bit period (e.g., ½ bit period on each end of the marks). The writing of the training sequence may then be phase-shifted such that the phase error is between 0 and 1T (or −1T and 0).

Figure 10:
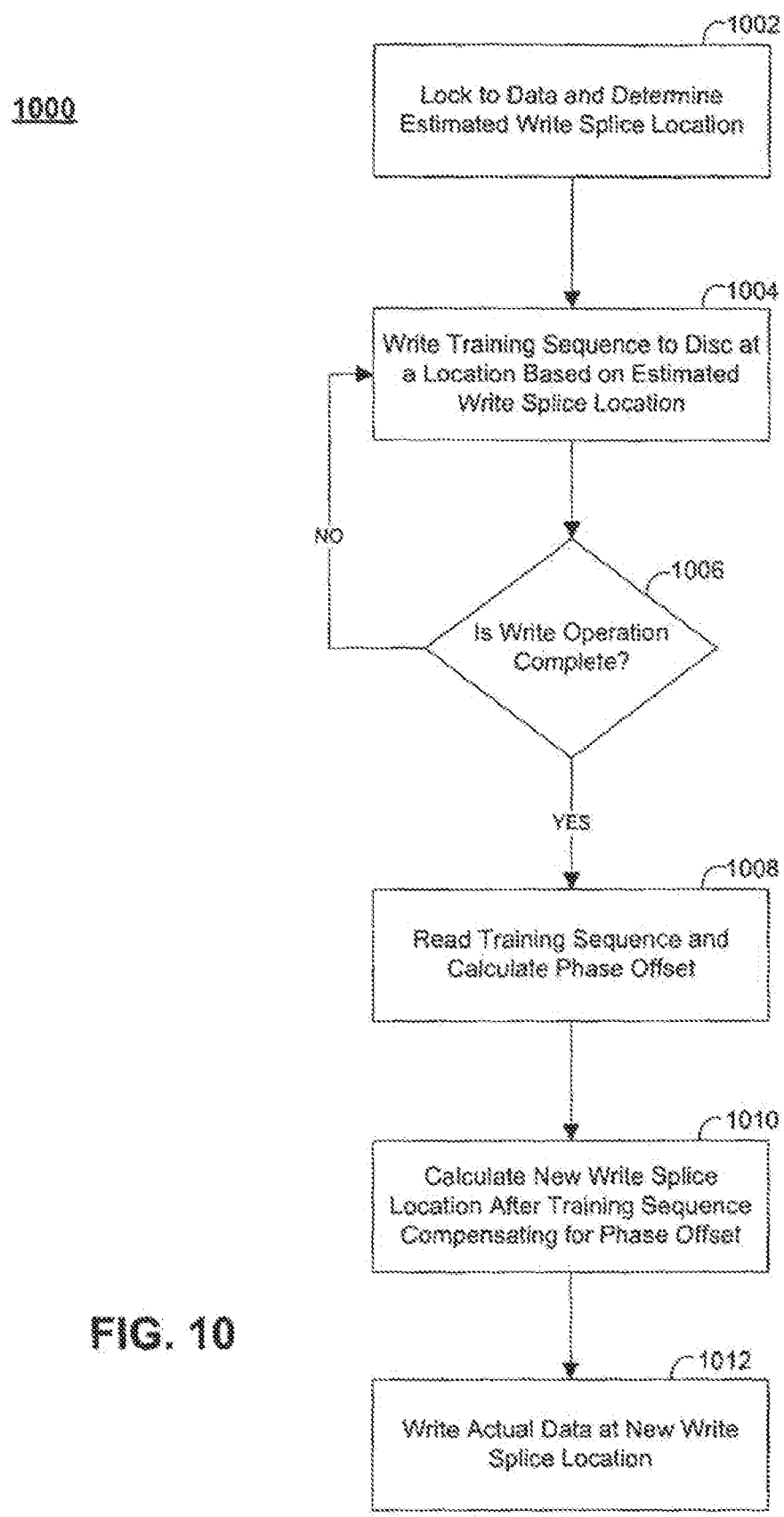
FIG. 10 is yet another illustrative method for creating an improved write splice using a non-rewritable media in accordance with one embodiment of the invention.

In another embodiment of the invention for non-rewritable media, the written training sequence is left unaltered (or overwritten with the data to be spliced). FIG. 10 shows illustrative process 1000 describing this approach. Steps 1002, 1004, 1006, and 1008 may be similar or the same as steps 802, 804, 806, and 808 of illustrative process 800 (FIG. 8). However, at step 1010 a new write splice location (compensated for the estimated phase offset) may be calculated after the written training sequence. The actual data may be written after the training sequence at step 1012. This embodiment may introduce some delay into the optical channel because the actual data was written after the training sequence, but this delay is typically negligible because the training sequence is preferably very short. The delay may be compensated for using error-correcting or timing-compensation circuitry.

Figure 11:
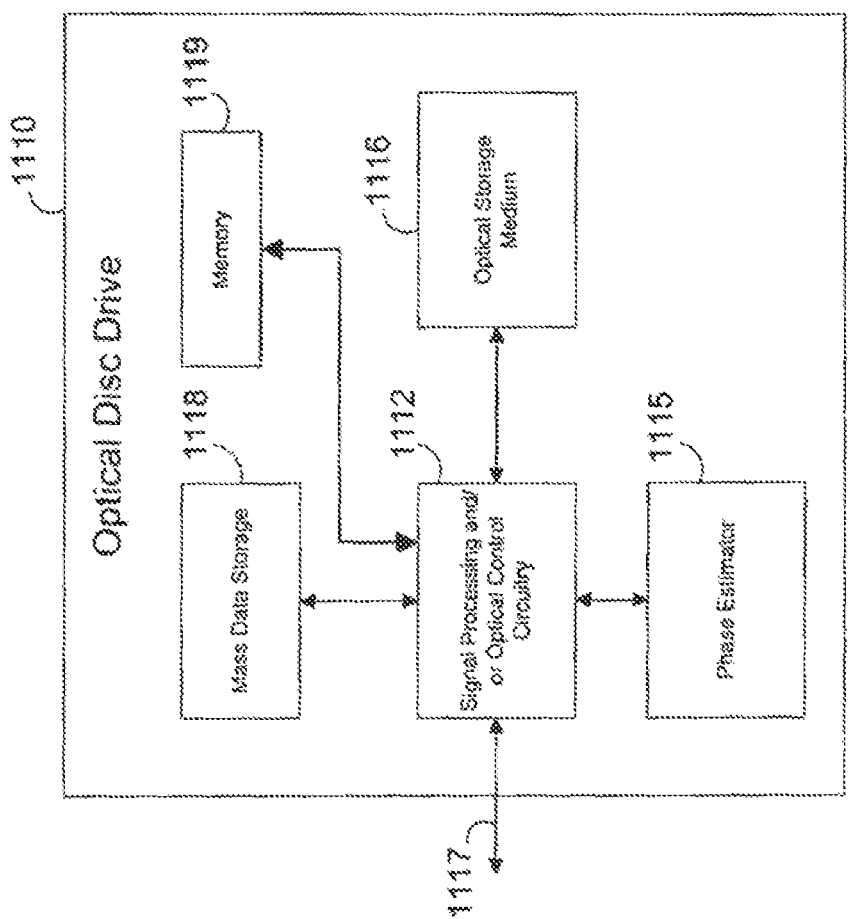
FIG. 11 is a block diagram of an exemplary optical disc drive that can employ the disclosed technology.

Referring now to FIG. 11, an exemplary implementation of the present invention is shown. The improved write splice of the present invention may be used in any device with an optical recording channel. These devices may include various optical drives, such as CD drives, DVD drives, HD-DVD drives, mini-disc players, and various media players with optical storage or recording support.

As shown in FIG. 11, the present invention can be implemented in optical disc (e.g., CD, DVD, HD-DVD, Blu-Ray) drive 1110. The present invention may implement either or both signal processing and/or optical control circuitry, which are generally identified in FIG. 11 at 1112, and/or mass data storage of the optical drive 1110. The signal processing and/or optical control circuitry 1112 and/or other circuits (not shown) in the optical drive 1110 may process data, perform coding and/or encryption, perform calculations, and/or format data that is read from and/or data written to an optical storage medium 1116. In some implementations, the signal processing and/or optical control circuitry 1112 and/or other circuits (not shown) in the optical drive 1110 can also perform other functions such as encoding and/or decoding and/or any other signal processing functions associated with an optical drive. The signal processing and/or optical control circuitry 1112 may also include an optical pick-up unit (not shown) which may read data from optical storage medium 1116. In some embodiments, optical disc drive 1110 includes optical recording and/or rewriting capabilities, in which case the signal processing and/or optical control circuitry 1112 may cause a laser to write data from memory 1119, mass data storage 1118, or phase estimator 1115 to the optical storage medium 1116.

Phase estimator 1115 may comprise any hardware and/or software for measuring the phase of a signal received from signal processing and/or optical control circuitry 1112. For example, phase estimator 1115 may include phase estimator 400 of FIG. 4. In some embodiments, phase estimator 1115 may include a quadrature demodulator. Signal processing and/or optical control circuitry 1112 may use the phase estimate computed by phase estimator 1115 to adjust a write splice location on optical storage medium 1116, as described in more detail above in regard to FIGS. 6-10.

The optical drive 1110 may communicate with an output device (not shown) such as a computer, television or other device via one or more wired or wireless communication links 1117. The optical drive 1110 may communicate with mass data storage 1118 that stores data in a nonvolatile manner. The mass data storage 1118 may include a hard disk drive (HDD). The HDD may be a mini HDD that includes one or more platters having a diameter that is smaller than approximately 1.8". The optical drive 1110 may be connected to memory 1119 such as RAM, ROM, low latency nonvolatile memory such as flash memory and/or other suitable electronic data storage.

It will be understood that the foregoing is only illustrative of the principles of the invention, and that various modifications can be made by those skilled in the art without departing from the scope and spirit of the invention. For example, the applications described above are merely illustrative. The improved write splice of the present invention may be used in any device with an optical recording channel.

What is claimed is:

1. A method for splicing a new data set to an existing data set on an optical medium, the method comprising:
   determining a first estimated write splice location in a calibration or test area of the optical medium;
   writing a training pattern to the optical medium at the first estimated write splice location;
   reading the training pattern from the optical medium;
   calculating a phase offset estimate based on the training pattern read;
   determining a second estimated write splice location for the existing data set;
   adjusting the second estimated write splice location to compensate for the calculated phase offset estimate; and
   writing the new data set at the adjusted second estimated write splice location.

2. The method of claim 1 wherein writing the training pattern to the optical medium comprises writing a monotone sequence to the optical medium.

3. The method of claim 2 wherein calculating the phase offset estimate based on the training pattern read comprises measuring the phase of training pattern readback waveform.

4. The method of claim 3 wherein measuring the phase of the training pattern readback waveform comprises measuring the phase of the training pattern readback waveform using a quadrature demodulator.

5. The method of claim 1 wherein determining the first and second estimated write splice locations comprises locking a timing loop to a disc wobble signal.

6. The method of claim 1 wherein determining the first and second estimated write splice locations comprises locking a timing loop to a disc data signal.

7. The method of claim 1 wherein the optical medium is selected from the group consisting of a CD medium, a DVD medium, an HD-DVD medium, and a Blu-Ray medium.

8. The method of claim 1 wherein writing the new data set at the adjusted second estimated write splice location comprises writing the new data set while locking a timing loop to a disc wobble signal.

9. An optical drive for splicing a new data set to an existing data set on an optical medium, the optical drive configured to:
   determine a first estimated write splice location in a calibration or test area of the optical medium;
   write a training pattern to the optical medium at the first estimated write splice location;
   read the training pattern from the optical medium;
   calculate a phase offset estimate based on the training pattern read;
   determine a second estimated write splice location for the existing data set;
   adjust the second estimated write splice location to compensate for the calculated phase offset estimate; and
   write the new data set at the adjusted second estimated write splice location.

10. The optical drive of claim 9 wherein the training pattern is a monotone sequence.

11. The optical drive of claim 10 wherein the optical drive is further configured to measure a phase of a training pattern readback waveform.

12. The optical drive of claim 11 wherein the optical drive comprises a quadrature demodulator.

13. The optical drive of claim 9 wherein the optical drive is further configured to lock a timing loop to a disc wobble signal.

14. The optical drive of claim 9 wherein the optical drive is further configured to lock a timing loop to a disc data signal.

15. The optical drive of claim 9 wherein the optical medium is selected from the group consisting of a CD medium, a DVD medium, an HD-DVD medium, and a Blu-Ray medium.

16. The optical drive of claim 9 wherein the optical drive is further configured to write the new data set while locking a timing loop to a disc wobble signal.

* * * * *